US008430066B2

(12) United States Patent  (10) Patent No.: US 8,430,066 B2
Franklin  (45) Date of Patent: Apr. 30, 2013

(54) COLLAPSIBLE UMBRELLA BASED ANIMAL RESTRAINT

(75) Inventor: Michael David Franklin, Fort Worth, TX (US)

(73) Assignee: Michael D. Franklin, Stillwater, OK (US)

( * ) Notice: Subject to any disclaimer, the term of this patent is extended or adjusted under 35 U.S.C. 154(b) by 152 days.

(21) Appl. No.: 12/804,081

(22) Filed: Jul. 13, 2010

(65) Prior Publication Data

US 2011/0067647 A1 Mar. 24, 2011

Related U.S. Application Data

(60) Provisional application No. 61/270,578, filed on Jul. 13, 2009.

(51) Int. Cl.
*A01K 15/00* (2006.01)
*A01K 1/04* (2006.01)

(52) U.S. Cl.
USPC ........................................... 119/756; 119/786

(58) Field of Classification Search .................. 119/701, 119/702, 703, 712, 753, 756, 769, 786, 787
See application file for complete search history.

(56) References Cited

U.S. PATENT DOCUMENTS

| 3,286,962 | A | * | 11/1966 | Warth | 248/545 |
| 3,981,274 | A | * | 9/1976 | Curtis | 119/701 |
| 4,147,129 | A | * | 4/1979 | Ruplen | 119/28.5 |
| 4,173,974 | A | | 11/1979 | Belliveau | |
| 4,316,433 | A | | 2/1982 | Hebert | |
| 4,546,730 | A | * | 10/1985 | Holland | 119/780 |
| 4,693,212 | A | | 9/1987 | Black | |
| 5,085,174 | A | | 2/1992 | Etkin | |
| 5,092,592 | A | | 3/1992 | FitzMaurice | |
| 5,103,769 | A | | 4/1992 | Macintosh | |
| 5,581,853 | A | | 12/1996 | Miller et al. | |
| 5,870,974 | A | * | 2/1999 | Johnson | 119/786 |
| 5,894,748 | A | * | 4/1999 | Capperrune | 70/16 |
| 5,918,611 | A | * | 7/1999 | Amato | 135/16 |
| 6,374,771 | B1 | * | 4/2002 | Zwickle | 119/28.5 |
| 6,401,656 | B1 | * | 6/2002 | Adkisson | 119/51.01 |
| 6,499,436 | B1 | * | 12/2002 | Capperrune | 119/792 |

(Continued)

FOREIGN PATENT DOCUMENTS

WO WO 2008121314 A2 * 10/2008

*Primary Examiner* — Son T Nguyen
*Assistant Examiner* — Kathleen Iwasaki

(57) ABSTRACT

This system comprises a platform used as a restraint for animals and pets which design is based on an umbrella like motion to collapse and expand for easy use, transport and storage. The platform will connect to any readily available generic harness having a ventral strap, collar strap, and girth strap which by the design of these components provides a secure point of connection between the animal's or pet's front legs and the center of the platform. The platform is circular in form with a centered connection point that uses the animal's own weight and position to prevent free movement. The animal or pet can sit or stand but is limited in directional movement by the connection between the platform and the harness. The platform includes a plurality of umbrella ribs that are installed on a portion of the main hub and are capable of being folded, a plurality of support ribs respectively supporting the platform ribs, a inner locking hub to which an end of each of the support ribs is hingedly coupled and which uncouples from the main hub to fold or unfold the platform.

1 Claim, 5 Drawing Sheets

U.S. PATENT DOCUMENTS

| | | |
|---|---|---|
| 6,871,616 B2 * | 3/2005 | Zhadan-Milligan et al. .. 119/795 |
| 7,021,246 B2 * | 4/2006 | Seymour ........................ 119/850 |
| 7,036,519 B2 * | 5/2006 | Godshaw et al. ................ 135/16 |
| 7,353,775 B1 * | 4/2008 | Stelmach .................... 119/61.54 |
| 7,921,815 B2 * | 4/2011 | Moran .......................... 119/786 |
| 7,926,447 B2 * | 4/2011 | Flannery ...................... 119/28.5 |
| 2002/0175262 A1 * | 11/2002 | Brooks, III .................... 248/530 |
| 2007/0056528 A1 * | 3/2007 | Schwartz ...................... 119/796 |
| 2007/0289555 A1 * | 12/2007 | Campbell ..................... 119/786 |
| 2008/0127897 A1 * | 6/2008 | Flannery ...................... 119/28.5 |
| 2008/0314336 A1 * | 12/2008 | Church et al. ................ 119/771 |

\* cited by examiner

COLLAPSIBLE UMBRELLA BASED ANIMAL RESTRAINT

This application claims priority from provisional patent application No. 61/270,578, filing date on Jul. 13, 2009.

STATEMENT REGARDING FEDERALLY SPONSORED RESEARCH OR DEVELOPMENT

"Not applicable"

BACKGROUND OF THE INVENTION

1. Field of Invention

The present invention relates to a portable animal and pet restraint that will fold in an umbrella like fashion for transportation, and when expanded, relies on the animal's weight upon the platform to inhibit movement from the chosen location.

2. Description of Related Art

Many methods are used to restrain pets including cages or tethers. Though both are portable cages can be bulky and cumbersome to set up, while tethers of any material can be hazardous to the animal and others. In addition tethers must be fastened to an object or staked to the ground. When indoors this is not an option and often times the ground is not suitable for proper staking, such as when it is too wet or rocky. Platforms that restrain the animal by using its own weight also exist but have not been design to be light and portable while maintaining the structural integrity required to resist the movements of the animal.

BRIEF SUMMARY OF DISCLOSURE

The prior art does not present a light, strong, portable restraint that does not require a tether or staking. It is the object of the invention to provide a pet restraint to fill this niche. It is also the intent to provide a restraint system that will fold into a compact area to facilitate easy transportation of the platform. This system is useful for animals and pets of varying sizes.

This system comprises a platform used as a restraint for animals and pets which design is based on an umbrella like motion to collapse and expand for easy use, transport and storage. The platform will connect to any readily available generic harness having a ventral strap, collar strap, and girth strap which by the design of these components provides a secure point of connection between the animal's or pet's front legs and the center of the platform. The platform is circular in form with a centered connection point that uses the animal's own weight and position to prevent free movement. The animal or pet can sit or stand but is limited in directional movement by the connection between the platform and the harness.

The platform includes a plurality of umbrella ribs that are installed on a portion of the main hub and are capable of being folded, a plurality of support ribs respectively supporting the platform ribs, a inner locking hub to which an end of each of the support ribs is hingedly coupled and which uncouples from the main hub to fold or unfold the platform.

DETAILED DESCRIPTION OF THE DISCLOSURE

Figure 1:
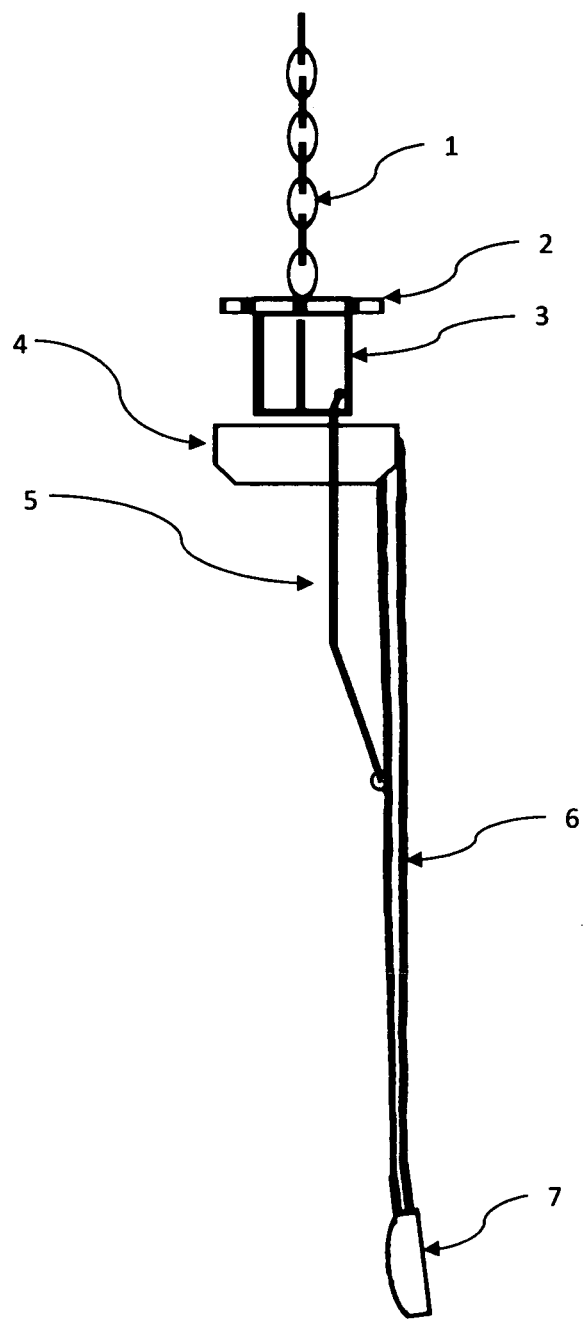
FIG. 1 is a view of one of the eight primary rib 6 and stretcher 5 assemblies which are hingely connected to the top notch 4 and runner 3 respectively. This assembly is in the collapsed state. When collapsed the platform is in the portable state.
Figure 2:
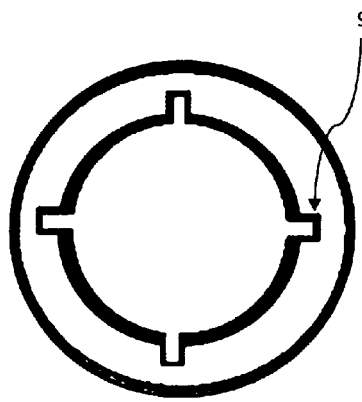
FIG. 2 is a top view of the top notch 4 showing the locking cog receptacles 9.
Figure 3:
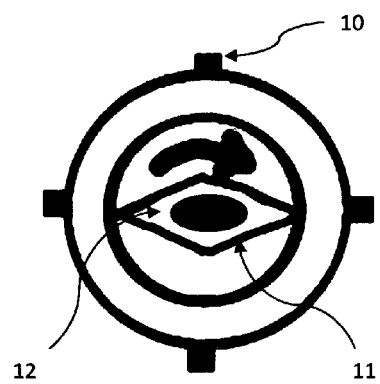
FIG. 3 is the top view of the locking ring showing the locking knob 11, chain fastener 12, and locking cogs 10.
Figure 4:
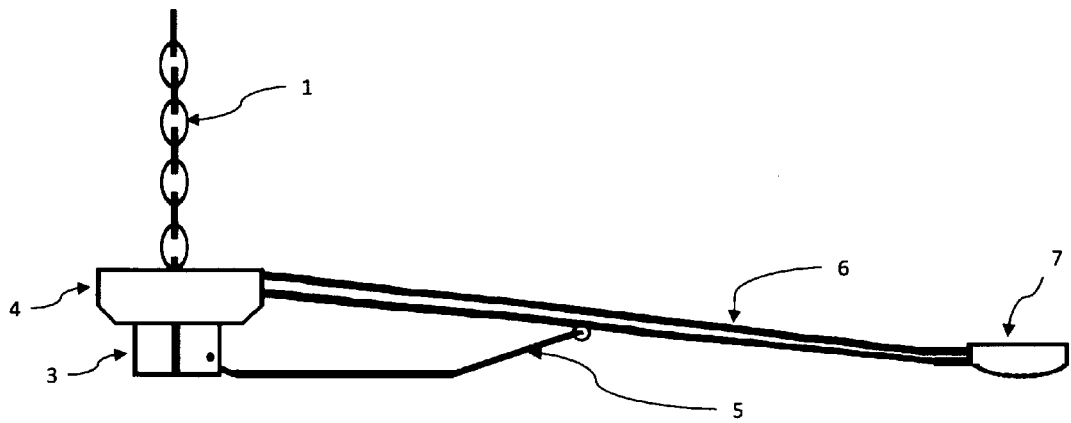
FIG. 4 is a view of the same components in FIG. 1 but in the expanded state. When expanded the platform is in the functional state having an outer edge resting on the ground supported by the end caps 7.
Figure 5:
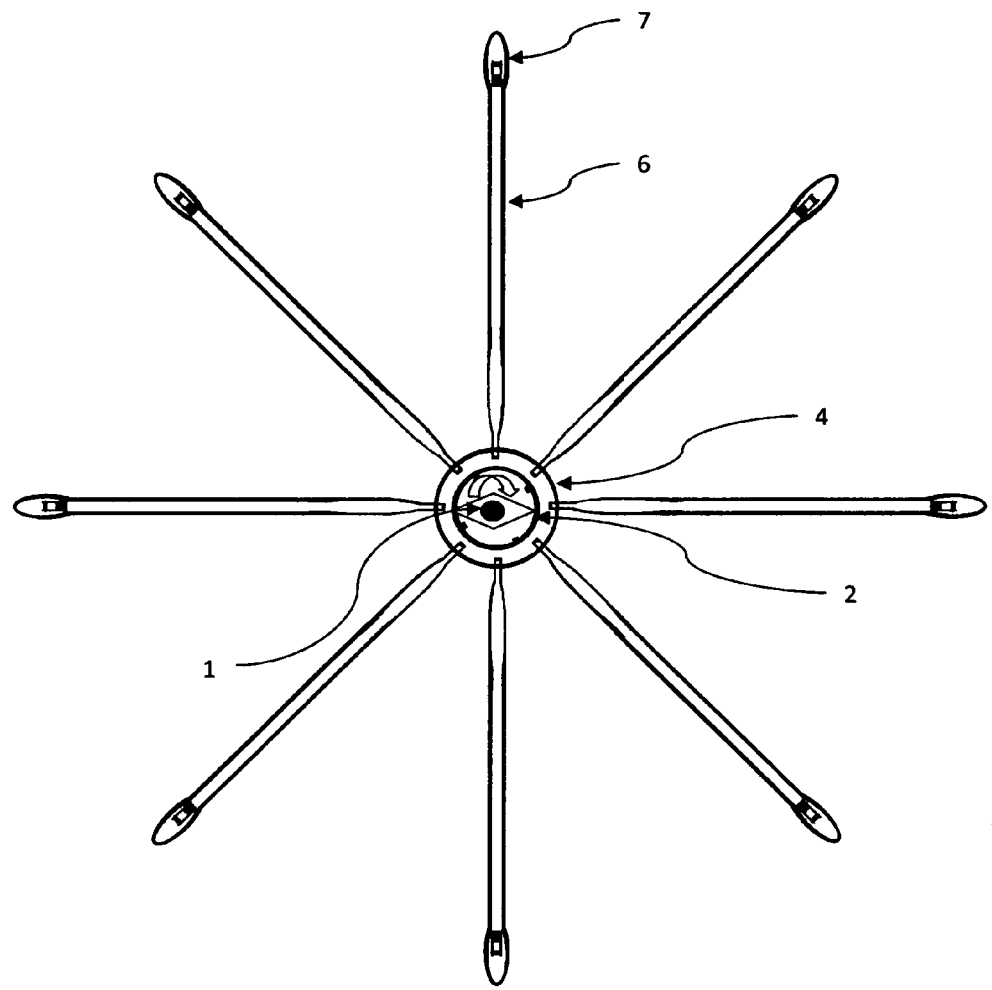
FIG. 5 represents the functional state of the frame when all eight of the primary rib 6 and stretcher 5 assemblies are fully expanded.
Figure 6:
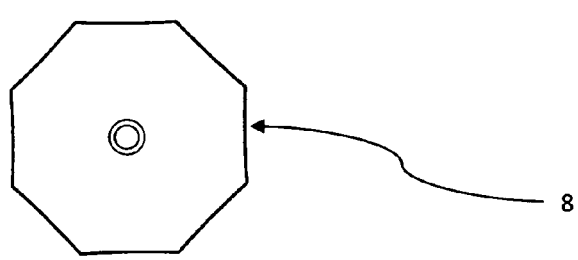
FIG. 6 is a view of the nylon cover 8 that is connected to the primary ribs 6 and stretched by the stretchers 5 when the frame is fully expanded as shown in FIG. 5.
Figure 7:
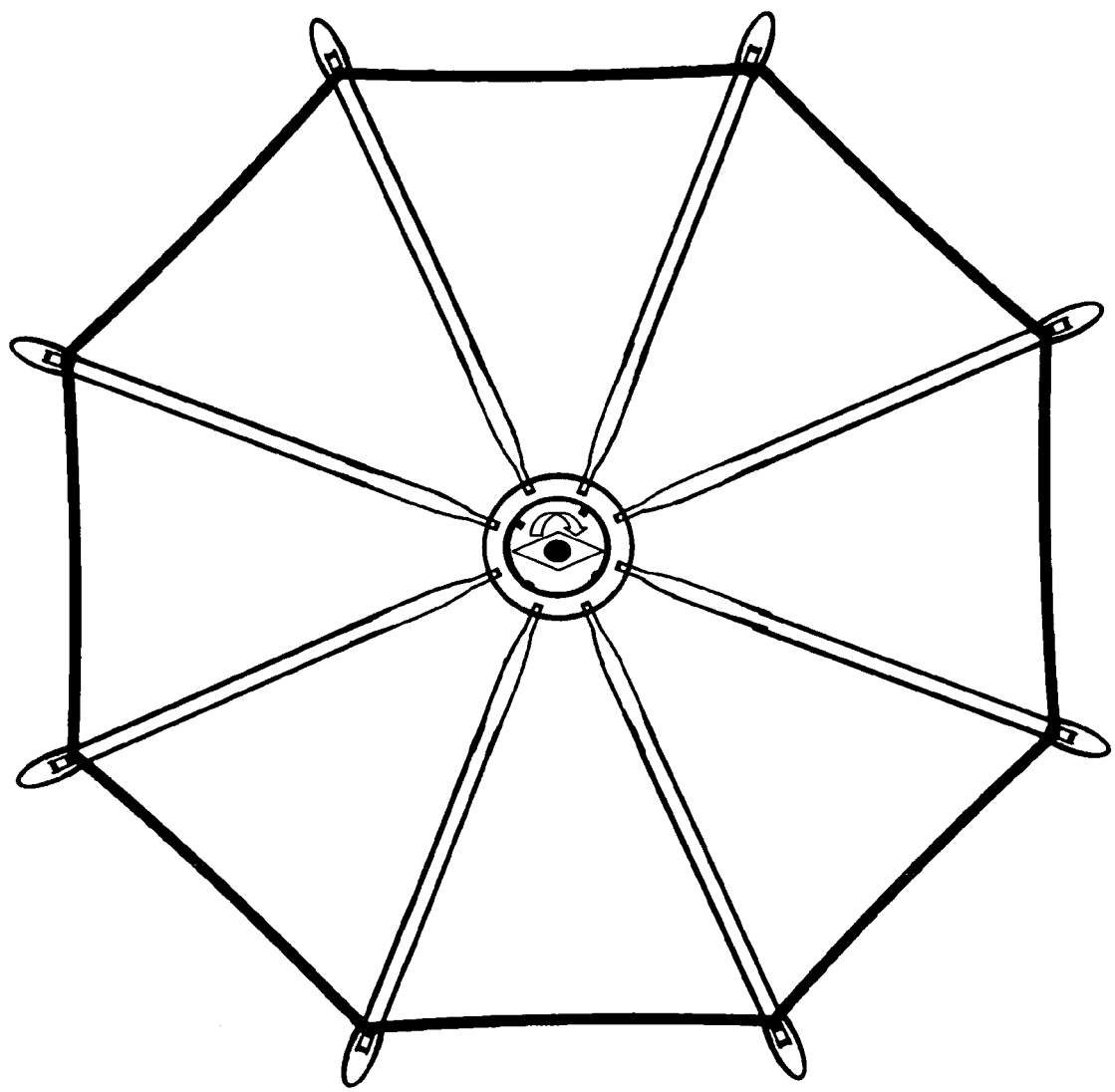
FIG. 7 shows the frame FIG. 5 comprising all eight primary rib 6 and stretcher 5 assemblies fully expanded with the cover 8 attached and stretched.
Figure 8:
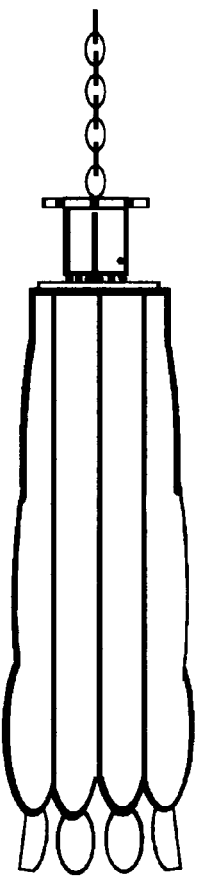
FIG. 8 is a view of the complete platform in a collapsed state.
Figure 9:
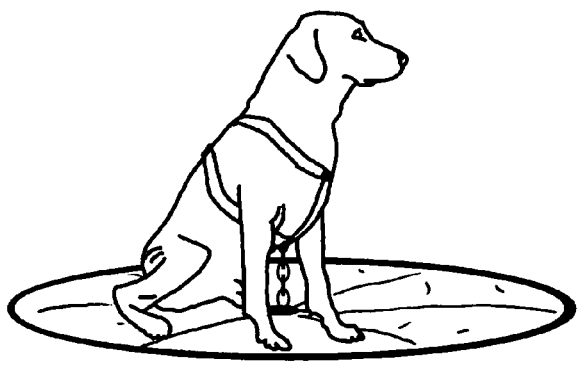
FIG. 9 is a view of the platform in the expanded state attached to the harness of a pet.
Figure 10:
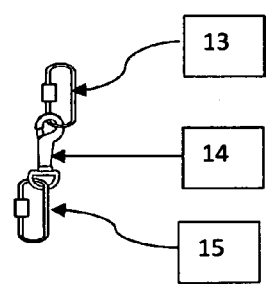
FIG. 10 is a view of the stay 14, the harness D-ring 13, and the chain D-ring 15.

The platform is comprised of a frame FIG. 5 with the cover 8. A plurality of primary ribs 6 are connected to the top notch 4. The runner 3 connects to a plurality of stretchers 5. The stretchers use a hinged connection to the runner 3 on one end and another hinged connection to a pivot point on the primary ribs 6. The runner 3 slides into the top notch 4 and is locked into place by the locking ring 2. The locking ring 2 spins freely on the runner 3 until locked and has an opening to allow for the connection of the first end of chain 1 to the top of the runner 3 via the chain fastener 12. Thus, as the runner 3 is moved into the top notch, the stretchers move down and out pushing against the primary ribs 6. The primary ribs 6 are moved up against the cover 8 until the cover 8 is stretched against the top of the frame FIG. 5. In this fully expanded state the top of the runners 3 and the locking ring 2 are flush with the top of the top notch 4. The locking ring 2 is then turned in a clockwise motion using the locking ring knob 11 to engage the locking cogs 10 on the locking ring 2 with their corresponding cog receptacles 9 located in the top notch 4 thus, locking the frame FIG. 5 in an open position. To unlocked frame the locking ring 2 is turned in a counter clockwise motion releasing the locking cogs 10. The runner 3 is moved upward out of the top notch 4 releasing the tension on the stretchers 5 and subsequently pulling the primary ribs 6 down and inward to close the platform. The cover 8 folds along the ribs in an umbrella like fashion FIG. 8. Once the platform is expanded and locked the second end of chain 1 is attached to the chain D-ring 15 which in turn is connected to the stay 14. The harness D-ring 13 is attached to a generic pet harness between the animal's legs FIG. 9 and connected to stay 14.

The description above refers to particular embodiments of the present invention, it will be understood that many modifications may be made without departing from the spirit thereof. The accompanying claims are intended to cover such modifications as would fall within the true scope and spirit of the present invention.

What is claimed is:

1. A collapsible umbrella-based animal restraint, comprising:

a cover;

a frame, comprising:
   a plurality of primary ribs, each having one end connected to a top notch; and a plurality of stretchers, each having a first end pivotally coupled to a runner slidingly received within the top notch and a second end pivotally coupled to one of the primary ribs: and
a chain having a first end connected to a top of the runner and a second end attached to an animal harness;
   wherein, in use, the runner is slid into the top notch, causing the plurality of stretchers to push out against and extend the plurality of primary ribs and stretch the cover to form a platform having a top surface on which to restrain an animal and a bottom surface having an outer edge resting on the ground, and the second end of the chain is connected to the animal harness; and
   wherein the animal's weight upon the platform prevents directional movement of the animal.

* * * * *